H. WELLENKAMP.
SHIP MODEL TESTING.
APPLICATION FILED APR. 3, 1908.
978,090.
Patented Dec. 6, 1910.
2 SHEETS—SHEET 1.
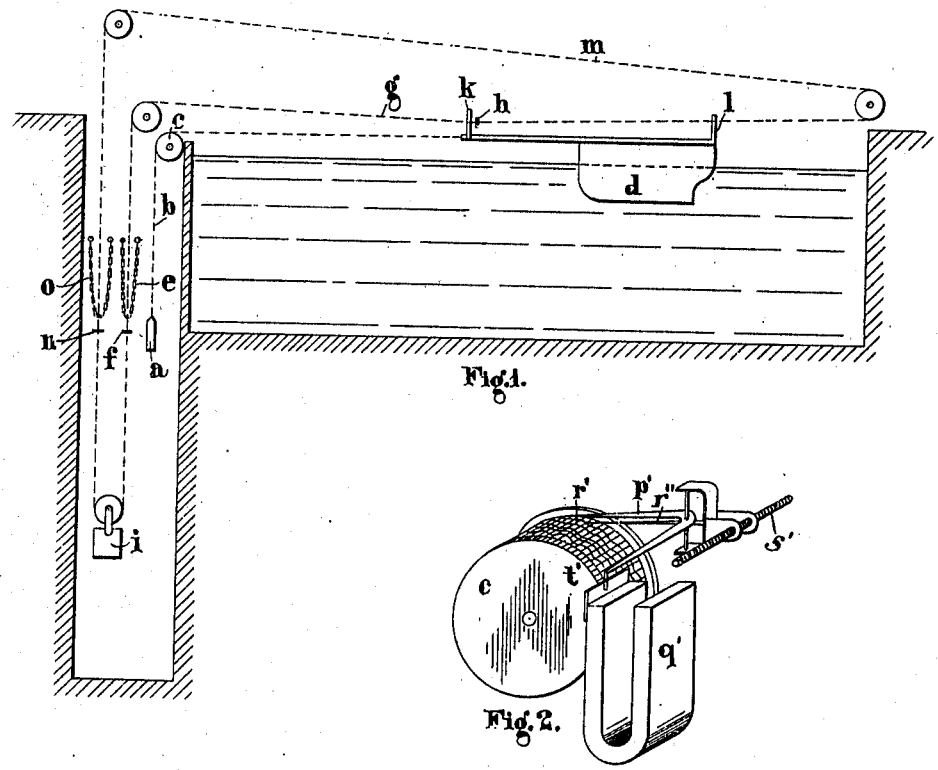
WITNESSES
R. L. Stevens
A. E. Powell
INVENTOR
HERMANN WELLENKAMP.
By Howson and Howson
HIS ATTORNEYS H. WELLENKAMP.
SHIP MODEL TESTING.
APPLICATION FILED APR. 3, 1908.
978,090.
Patented Dec. 6, 1910.
2 SHEETS—SHEET 2.
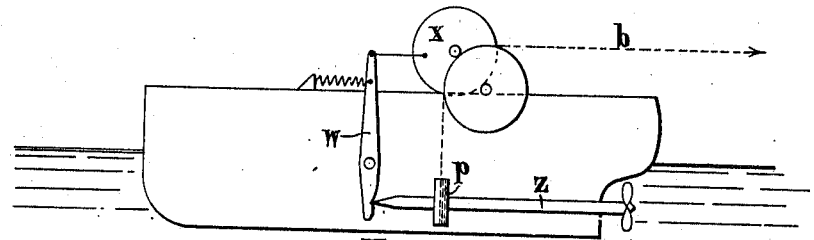
Fig. 3.
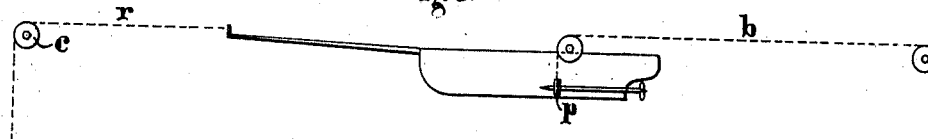
Fig. 4.
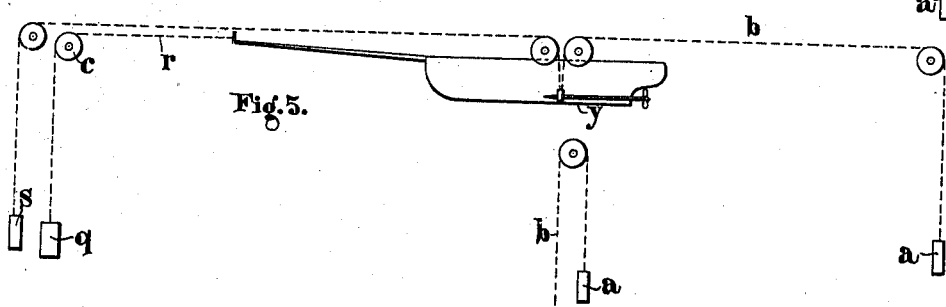
Fig. 5.
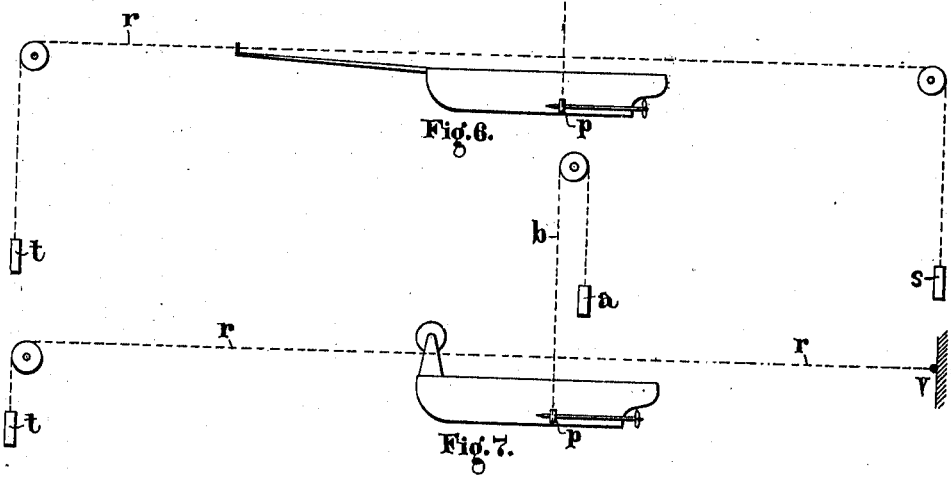
Fig. 6.
Fig. 7.
WITNESSES
R. L. Stevens.
A. E. Powell
INVENTOR
HERMANN WELLENKAMP.
By Howson and Howson
HIS ATTORNEYS.

UNITED STATES PATENT OFFICE.

HERMANN WELLENKAMP, OF KIEL, GERMANY.

SHIP-MODEL TESTING.

978,090.  Specification of Letters Patent.  Patented Dec. 6, 1910.

Application filed April 3, 1908. Serial No. 424,994.

*To all whom it may concern:*

Be it known that I, HERMANN WELLENKAMP, a subject of the German Emperor, and residing at Kiel, Germany, have invented certain new and useful Improvements in and Relating to Ship-Model Testing, of which the following is a specification.

This invention relates to improvements in the methods and means used for testing ships' models. As is well known in order to ascertain for any given shape of vessel the power required for a given speed, the resistance offered by the ship must be ascertained. Hitherto it has been usual to test models of ships for ascertaining the water resistance and so forth in experimental tanks fitted with Froude's well known, towing and measuring apparatus.

Hitherto it has been necessary to make the experimental tanks of very considerable length (100 to 200 meters or more) in consequence of which the initial costs, as well as the cost of upkeep, are unduly heavy. With the existing appliances, it has not been possible to substantially shorten the length of the tank without considerably reducing the reliability of the results. In the first place the heavy carriages which travel above the tank and tow the model, require a long distance for acceleration and retardation; consequently the actual measuring distance during which the speed must be maintained constant for a dynamometer measurements also becomes great owing to the necessity of dealing with average figures on account of the disturbances which cannot be altogether avoided.

The object of the present invention is to considerably decrease the length of the tank of such experimental stations and to obtain simplified measuring means which will enable more accurate results to be obtained.

The invention consists primarily in providing a short experimental tank with a device comprising a free falling adjustable weight suspended from a wire or the like adapted to maintain the movement of a model at an approximately uniform amount after an initial movement has been given to the model.

The arrangement enables me without difficulty to maintain the rate of speed while the measurement is made, consequently a very short measuring distance only is required for obtaining accurate results. A tuning fork chronograph is utilized to record the speed which can be ascertained to fractions of a millimeter per second. Any acceleration or retardation which is revealed by the record can then be noted and adjustment made accordingly.

The invention may be used for ascertaining the water resistance which must be overcome and thus the necessary towing force and it may be used for ascertaining the maximum speed at which a given force will move the model as well as for measuring the axial thrust of the propeller shaft in the case of propeller driven models.

The invention may be arranged in various ways according to the information required.

Referring now to the accompanying drawings, Figure 1 represents diagrammatically the arrangement of towing device used when resistances to the movement of ships, the towing forces and speeds are required. Fig. 2 represents diagrammatically a recording instrument. Figs. 3 to 7 represent arrangements of the towing devices adopted when it is desired to ascertain the propeller thrust.

In carrying the invention into effect as represented in Fig. 1, a towing weight, $a$, is suspended from a thin steel wire or the like, $b$, which passes around a recording drum, $c'$, and is attached to the bow-sprit of the model, $d$. In order to accelerate the model previous to making the measurements or to retard it after the measurements have been completed, a second wire, $g$, $m$, is passed over guide pulleys and held in tension by means of a weight, $i$. The part, $g$, of the wire passes between two forks, $k$ and $l$, on the model and carries between these forks a stop or catch $h$ firmly attached to the wire, $g$. Two looped chains, $e$ and $o$, which are considerably heavier than the normal towing weight, $a$, are suspended from fixed points within the well; the wires, *g* and *m*, pass through the bottoms of the loops and they carry stops, *n* and *f*, which are adapted to bear on the underside of the chain loops. These chains, *e* and *o*, supply the weight required for accelerating and retarding the speed of the model respectively.

The device for measuring the speed consists of a drum, *c'*, (Fig. 2). The surface of this drum is blackened by lamp-black or the like and is graduated on one side; a pointer, *r'*, connected by a bell crank lever, *p'*, to one arm of a vibratory tuning fork, *q'*, scribes waves of equal length upon the drum when its speed is constant, that is when the speed of the model is uniform. The bell crank lever *p'* is mounted upon the threaded spindle *s'* and as the latter is rotated at uniform speed, moves from one end to the other of the drum *c'* so that the wavy line traced by the pointer *r'* is spiral. In order to permit the bell crank lever to have this sliding movement notwithstanding its connection to the tuning fork, its arm which engages with the tuning fork is also forked and passes over a plate, *t'*, attached to the tuning fork. If measurement is to be made, the model is drawn to the right end of the reservoir, the fork, *k*, then bears against the stop, *h*, and the stop, *f*, bears against the bottom of the loop of the chain, *e*, and lifts the latter up. If the model is now released, it will be moved by the combined weight of the chain, *e*, and the small weight, *a*, and the movement of the model will become accelerated until the chain, *e*, falls to its lowest point, as indicated in Fig. 1. The accelerating force acting on the model thus automatically decreases from a maximum to zero so that no irregularities of movement of the model can occur. The wires, *g* and *m*, remain stationary, after the termination of the acceleration period. The model will now continue to move uniformly (providing the tension weight, *a*, is of the proper size) exclusively under the influence of that weight, *a*, with the end speed obtained, which obviously may be altered by varying the height to which the chain, *e*, is raised or by altering the relative positions of the forks, *k*, or the stops, *h*. The speed of the model will be transmitted through the towing wire, *b*, to the drum, *c'*. When the fork, *l*, reaches the stop, *h*, the model will have passed through the measuring distance and the speed of the model is then retarded owing to the catch, *n*, lifting the chain, *o*, in the same manner as was explained above with reference to the chain, *e*. The speeds are obtained from the distances marked on the drum in full size for every 1/100 of a second or other convenient graduation.

For ascertaining the amount of acceleration or retardation, it will only be necessary to connect by a line corresponding wave points which are separated from each other by an even number of waves and adjacent to one another.

For better ascertaining corresponding points, apart from the pointer, *r'*, another fixed pointer *r''* attached to the bearing of the bell crank lever, *p'*, may be provided which will mark the center line of the wave line. Then both lines will intersect one another, the straight line and wave line in distinctly marked points, so that the corresponding points can be accurately connected to each other. If the line connecting the points is a straight line the speed of the vessel was uniform, if however said line has the shape of a curve the speed has either been accelerated or retarded. In the first case the towing weight, *a*, was greater and in the second case smaller than the resistance offered by the model. Since it is possible without difficulty from the amount by which the distance per second is increased or decreased to ascertain the amount of acceleration or retardation $\delta$ and since also the total amount of the masses M is known, the product M$x\delta$ representing a force will give the amount by which the tension weight must be altered for the next trial. In case the tension weight increased or decreased by the product M$x\delta$ should still not give a sufficiently uniform speed, the trial should be repeated with a weight which has again been altered. When repeating one and the same experiment, care should of course be taken that the total driving weight $a+e$ and the starting distance remain unaltered with regard to size or length respectively.

For carrying out the method for ascertaining the propeller thrust, the arrangement will be the same in the following respects, (a), the model during a short starting period is driven by a special starting weight; (b) the speed according to its rate and nature is accurately ascertained with the aid of a tuning fork chronograph; (c) after completion of the measurement the model is retarded automatically; and (d) the tension weight is corrected to the measurement and the experiment repeated for insuring the greatest possible constant speed while the measurement is made.

While however in case of the arrangement shown in Fig. 1 the tension device influenced by the free falling weight is directly attached to the model, in the present case shown in Fig. 3, it is passed around a drum or disk rigidly mounted on the propeller shaft so that the latter is rotated and the model moved by means of the propeller thrust. For measuring the propeller thrust in every case, the propeller shaft is made to slide in an axial direction and with a force corresponding to the propeller thrust will act on a dynamometer of any known design, automatically recording the thrusts prevailing in every case. The tension wire, $b$ (Fig. 3) is wound to the drum, $p$, rigidly connected to the propeller shaft, $z$. The forward end of the propeller shaft which preferably works in ball or roller bearings to decrease friction, presses against the lever of a spring dynamometer, $w$. The other arm of this lever is fitted with a pointer and will consecutively record the propeller thrust upon a disk, $x$, which is moved proportionally to the revolutions of the propeller.

The driving of the propeller shaft is effected by the tension wire, $b$, unwinding from the drum, $p$. In case of the arrangement according to Fig. 5, the tension wire is passed around the disk, $p$, mounted on the propeller shaft, and the free end of the wire is held in tension by means of the small weight, $a$. As in the case of the arrangement according to Figs. 1 and 2, the drum, $c'$, serves to ascertain the speed of the model, a tuning fork chronograph marking waves upon said roller and which is either arranged on land and is by means of the wire, $r$, held in tension by the weight $q$ or $t$, or which, according to the arrangement shown in Fig. 7, is arranged on the model itself and upon the movement of the model is unwound on a wire fixed across the reservoir. The tension wire $b$, of the tension weight, $a$, is either passed from the back of the model over a guide roller fixed on land, or it passes over a guide roller fixed to the mast. In order to prevent any moving forces from being exerted on the model by means of the wires, $b$ and $r$, leading from the model in the front and rear, the force must be balanced, that is to say, if in case of the arrangement according to Figs. 4 and 5 the weight, $a$, is altered, the weight, $q$, must also be changed accordingly.

The model when passing through the measuring distance must move at a uniform speed. If the reading of the drum, $c'$, shows that the speed has not been uniform, the weight, $a$, in the manner as described hereinbefore must be altered or in case of the arrangement according to Figs. 4 and 5 the weight, $a$, and $q$, by the amount of force $M x \delta$ (M=total masses moved $\delta$=acceleration or retardation) and the trial must be repeated. The amount of work transmitted to the screw during the measurement equals the work caused by the falling of the weights, $a$ and $q$.

In the arrangement according to Fig. 6 from this amount there must be subtracted the amount of work which is involved in lifting the weight, $s$.

Having now described my invention what I claim as new and desire to secure by Letters Patent is:—

1. In tank testing appliances of the character described, means adapted to engage the model tested for imparting an initial velocity thereto, said means having limited duration of action a weight, and means in connection therewith for moving the model so as to maintain its initial velocity during the period of measurement after the means for imparting initial velocity has ceased to act.

2. In tank testing appliances of the character described, a weight having limited travel for imparting an initial velocity to the model tested, means whereby said weight may be secured to said model and means for limiting the travel of said weight, together with a lesser weight provided with means for securing the same to the model and adapted to maintain the initial velocity of the latter during the period of measurement after the first weight has ceased to act.

3. In tank testing appliances of the character described, a weight having limited travel for imparting an initial velocity to the model tested, means for securing said weight to the said model and means for automatically eliminating the action of said weight after its preliminary work in combination with means for maintaining, during the period of measurement, the initial velocity thus imparted to the model.

4. In tank testing appliances of the character described, a weight having limited travel for imparting an initial velocity to the model tested, means whereby said weight may be secured to said model and means for limiting the travel of said weight, together with a lesser weight provided with means for securing the same to the model and adapted to maintain the initial velocity of the latter during the period of measurement after the first weight has ceased to act, together with a tuning fork chronograph, a drum upon the circumference of which said chronograph makes its record and means for rotating said drum at a speed governed by the speed of said model.

5. In tank testing appliances of the character described, a weight having limited travel for imparting an initial velocity to the model tested, means whereby said weight may be secured to said model and means for limiting the travel of said weight, together with a lesser weight to maintain the initial velocity of the model during the period of measurement after the first weight has ceased to act, said model being provided with a propeller shaft and means for connecting said lesser weight operatively thereto.

6. In tank testing appliances of the character described, a weight having limited travel for imparting an initial velocity to the model tested, means whereby said weight may be secured to said model and means for limiting the travel of said weight, together with a lesser weight to maintain the initial velocity of the model during the period of measurement after the first weight has ceased to act, said model being provided with an axially movable propeller shaft and means for connecting said lesser weight operatively thereto, together with a dynamometer engaging said propeller-shaft.

In testimony whereof I have signed my name to this specification in the presence of two subscribing witnesses.

HERMANN WELLENKAMP.

Witnesses:
P. M. DAVIES,
C. A. OUTHWAITE.